(12) United States Patent
Jackson (10) Patent No.: US 11,034,437 B2
(45) Date of Patent: Jun. 15, 2021

(54) AIRCRAFT LANDING GEAR ASSEMBLIES, AIRCRAFT INCLUDING THE LANDING GEAR ASSEMBLIES, AND METHODS OF DEPLOYING THE LANDING GEAR ASSEMBLIES

(71) Applicant: The Boeing Company, Chicago, IL (US)

(72) Inventor: Rick A. Jackson, Fountain Valley, CA (US)

(73) Assignee: The Boeing Company, Chicago, IL (US)

( * ) Notice: Subject to any disclaimer, the term of this patent is extended or adjusted under 35 U.S.C. 154(b) by 124 days.

(21) Appl. No.: 16/419,548

(22) Filed: May 22, 2019

(65) Prior Publication Data

US 2020/0369381 A1 Nov. 26, 2020

(51) Int. Cl.
*B64C 25/40* (2006.01)
*B64C 25/34* (2006.01)
*B64C 25/26* (2006.01)

(52) U.S. Cl.
CPC .............. *B64C 25/40* (2013.01); *B64C 25/26* (2013.01); *B64C 25/34* (2013.01)

(58) Field of Classification Search
CPC ......... B64C 25/40; B64C 25/26; B64C 25/34; B64C 25/10
See application file for complete search history.

(56) References Cited

U.S. PATENT DOCUMENTS

| 1,914,092 | A | * | 6/1933 | Henrichsen | B64C 25/32 244/102 R |
| 2,323,640 | A | * | 7/1943 | Armstrong | B64C 25/10 244/102 R |
| 2007/0057117 | A1 | * | 3/2007 | Payen | B64C 25/14 244/100 R |
| 2012/0168561 | A1 | * | 7/2012 | Salmon | B64C 25/18 244/102 A |
| 2018/0334250 | A1 | * | 11/2018 | Klode | B64C 25/24 |

* cited by examiner

*Primary Examiner* — Rodney A Bonnette
(74) *Attorney, Agent, or Firm* — Dascenzo Gates Intellectual Property Law, P.C.

(57) ABSTRACT

Aircraft landing gear assemblies, aircraft including the landing gear assemblies, and methods of deploying landing gear assemblies. The landing gear assemblies include an elongate landing gear strut, a wheel assembly, and a deployment structure. The elongate landing gear strut includes a first strut end region, an opposed second strut end region, and a wheel assembly mount. The wheel assembly is coupled to the wheel assembly mount. The deployment structure is configured to selectively transition the landing gear assembly between a stowed state and a deployed state.

20 Claims, 8 Drawing Sheets

AIRCRAFT LANDING GEAR ASSEMBLIES, AIRCRAFT INCLUDING THE LANDING GEAR ASSEMBLIES, AND METHODS OF DEPLOYING THE LANDING GEAR ASSEMBLIES

FIELD

The present disclosure relates generally to aircraft landing gear assemblies, to aircraft that include the aircraft landing gear assemblies, and/or to methods of deploying the landing gear assemblies.

BACKGROUND

Landing gear assemblies may be utilized to support an aircraft while the aircraft is on the ground. This may include supporting the aircraft during takeoff, landing, taxiing, docking, fueling, maintenance, etc. of the aircraft. Conventional nose landing gear assemblies include an oleo strut with a wheel attached to a first end and a pivot on a second, opposed, end. The pivot is rotationally attached to a pivot mount of the aircraft. When the conventional nose landing gear assemblies are deployed, the oleo strut and wheel rotate downward and rearward about the pivot.

While conventional nose landing gear assemblies may be effective in certain aircraft, they may be ineffective with others. As an example, spatial constraints may make it challenging to provide a desired length for the oleo strut and also to provide a desired weight distribution on the nose landing gear while the aircraft is on the ground. Thus, there exists a need for improved aircraft landing gear assemblies, aircraft including the landing gear assemblies, and/or methods of deploying the landing gear assemblies.

SUMMARY

Aircraft landing gear assemblies, aircraft including the landing gear assemblies, and methods of deploying landing gear assemblies. The landing gear assemblies include an elongate landing gear strut, a wheel assembly, and a deployment structure. The elongate landing gear strut includes a first strut end region, an opposed second strut end region, and a wheel assembly mount. The wheel assembly is coupled to the wheel assembly mount. The deployment structure is configured to selectively transition the landing gear assembly between a stowed state and a deployed state.

In some examples, the deployment structure includes an aircraft mount. In these examples, the deployment structure is configured to operatively translate the second strut end region relative to the aircraft mount as the landing gear transitions between the stowed state and the deployed state.

In some examples, the elongate landing gear strut further includes a first strut mount and a second strut mount. In these examples, the deployment structure is configured to rotate the first strut mount about a first axis of rotation and to rotate the second strut mount about a second axis of rotation as the landing gear assembly transitions between the stowed state and the deployed state.

The aircraft include the landing gear assemblies. The methods include methods of deploying and/or utilizing the landing gear assemblies.

DESCRIPTION

FIGS. 1-13 provide illustrative, non-exclusive examples of aircraft 10, of landing gear assemblies 100, of deployment structures 200, and/or of methods, according to the present disclosure. Elements that serve a similar, or at least substantially similar, purpose are labeled with like numbers in each of FIGS. 1-13, and these elements may not be discussed in detail herein with reference to each of FIGS. 1-13. Similarly, all elements may not be labeled in each of FIGS. 1-13, but reference numerals associated therewith may be utilized herein for consistency. Elements, components, and/or features that are discussed herein with reference to one or more of FIGS. 1-13 may be included in and/or utilized with any of FIGS. 1-13 without departing from the scope of the present disclosure.

In general, elements that are likely to be included in a given (i.e., a particular) embodiment are illustrated in solid lines, while elements that are optional to a given embodiment are illustrated in dashed lines. However, elements that are shown in solid lines are not essential to all embodiments, and an element shown in solid lines may be omitted from a particular embodiment without departing from the scope of the present disclosure.

Figure 1:
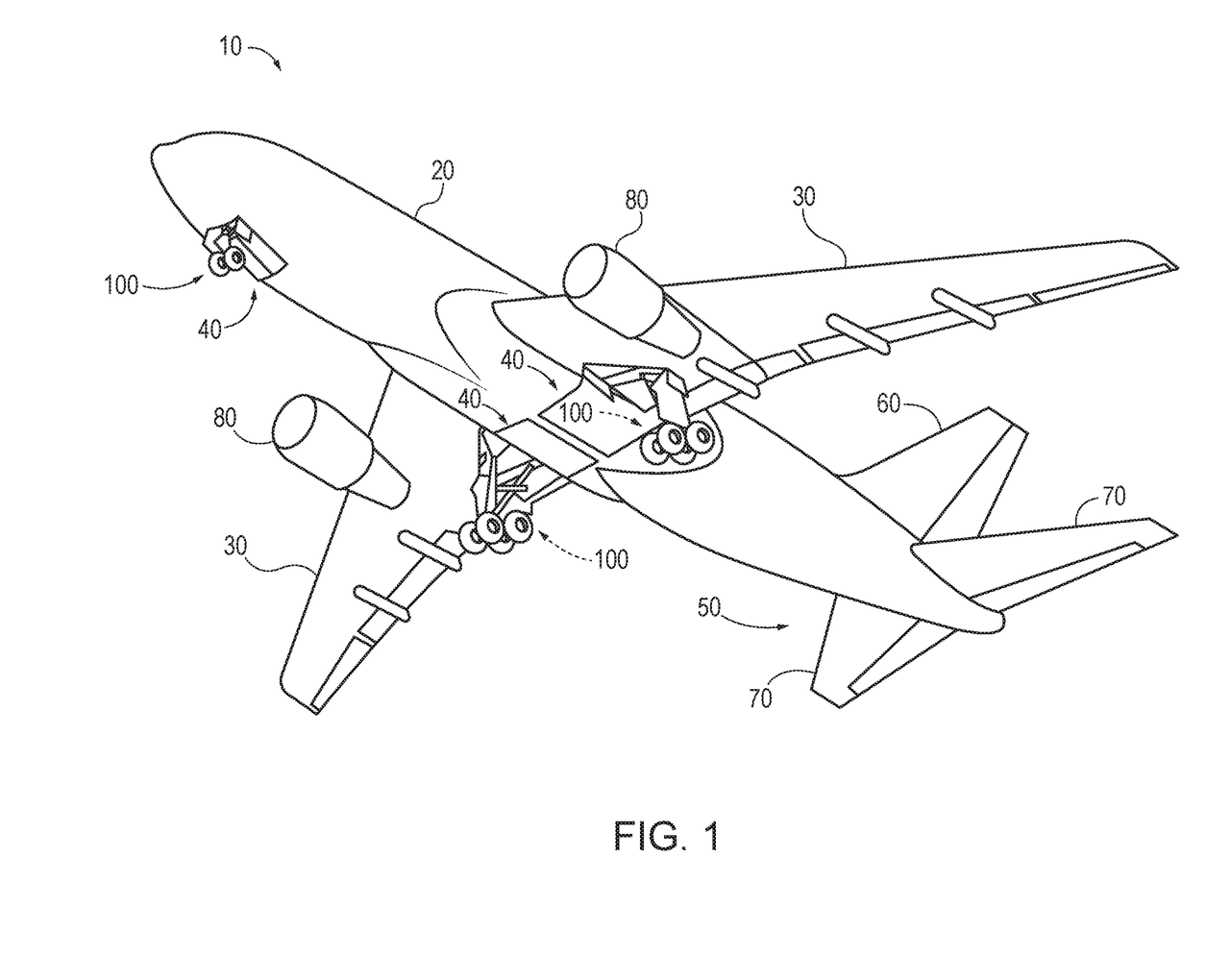
FIG. 1 is a schematic illustration of an aircraft that may include landing gear assemblies and/or may be utilized with methods, according to the present disclosure.

FIG. 1 is a schematic illustration of an aircraft 10 that may include landing gears assemblies 100 and/or that may be utilized with methods, according to the present disclosure. Aircraft 10 includes a fuselage 20 and at least one wing 30. Aircraft 10 also includes a landing gear bay 40 and a landing gear assembly 100 positioned within and/or operatively attached to the aircraft within the landing gear bay. Landing gear assembly 100 may include and/or be a nose landing gear assembly for the aircraft.

As also illustrated in FIG. 1, aircraft 10 may include one or more engines 80. Additionally or alternatively, aircraft 10 may include a tail assembly 50, which may include a vertical stabilizer 60 and/or at least one horizontal stabilizer 70.

Figure 2:
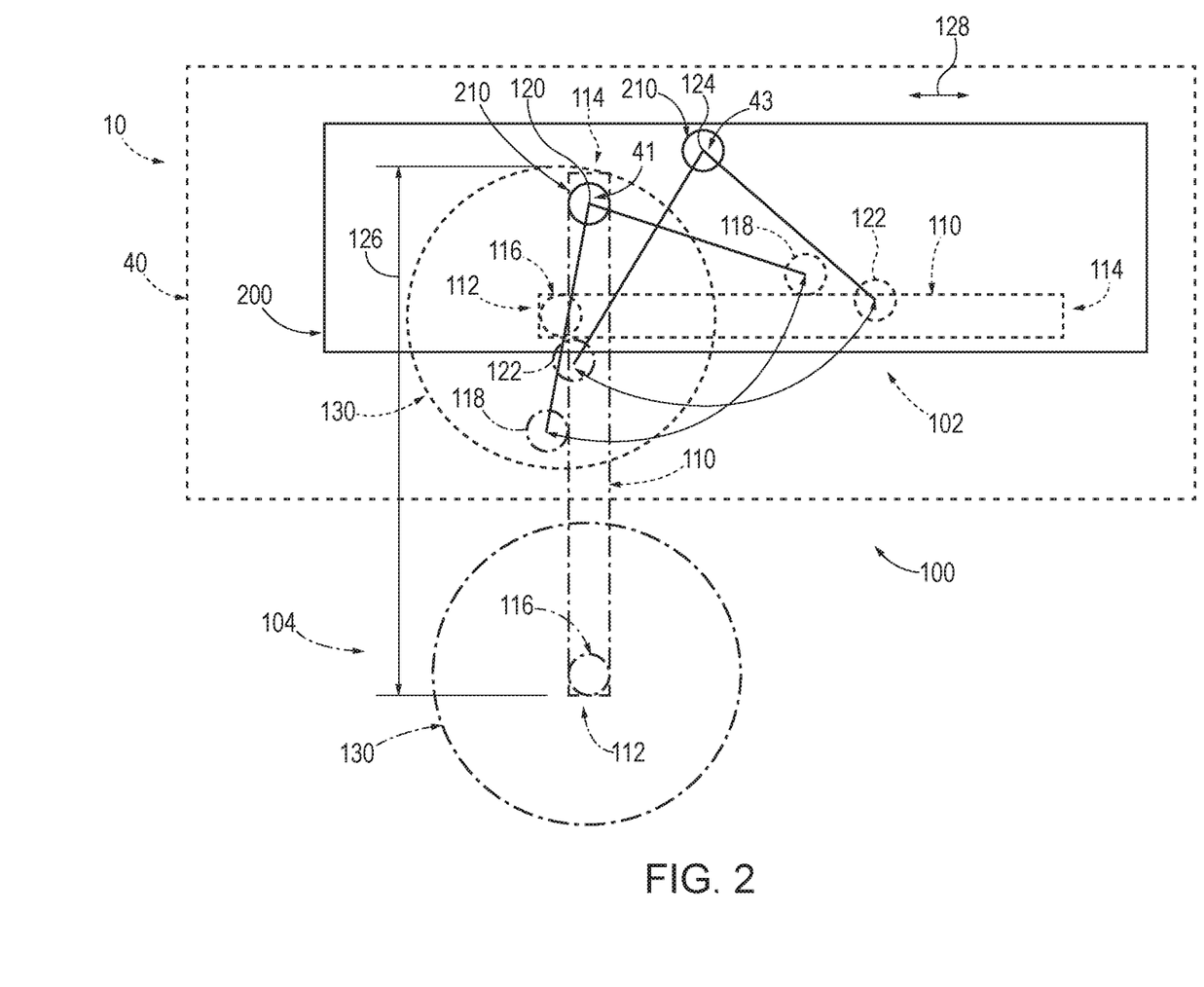
FIG. 2 is a schematic illustration of examples of landing gear assemblies according to the present disclosure.
Figure 3:
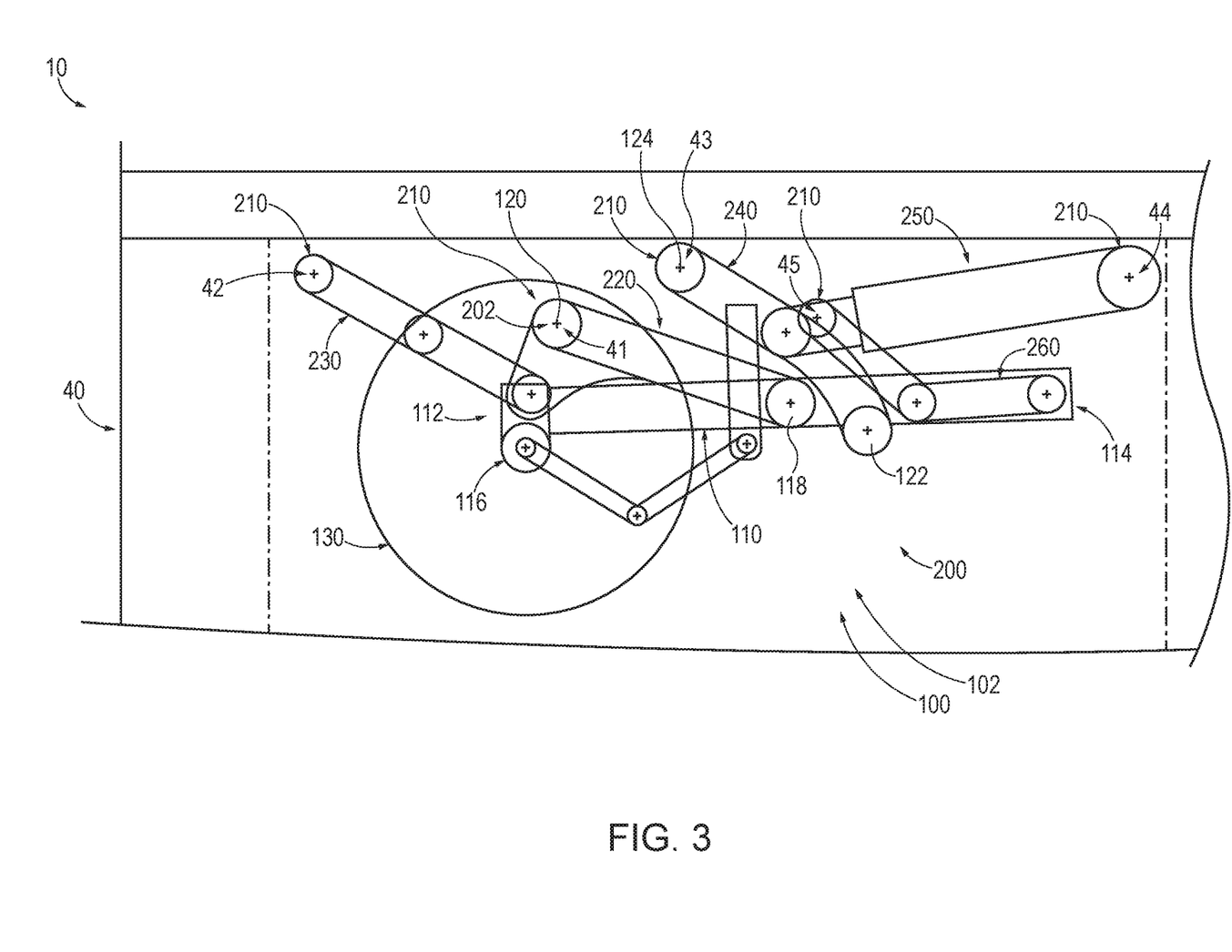
FIG. 3 is a less schematic side view illustrating an example of a landing gear assembly in a stowed state, according to the present disclosure.
Figure 4:
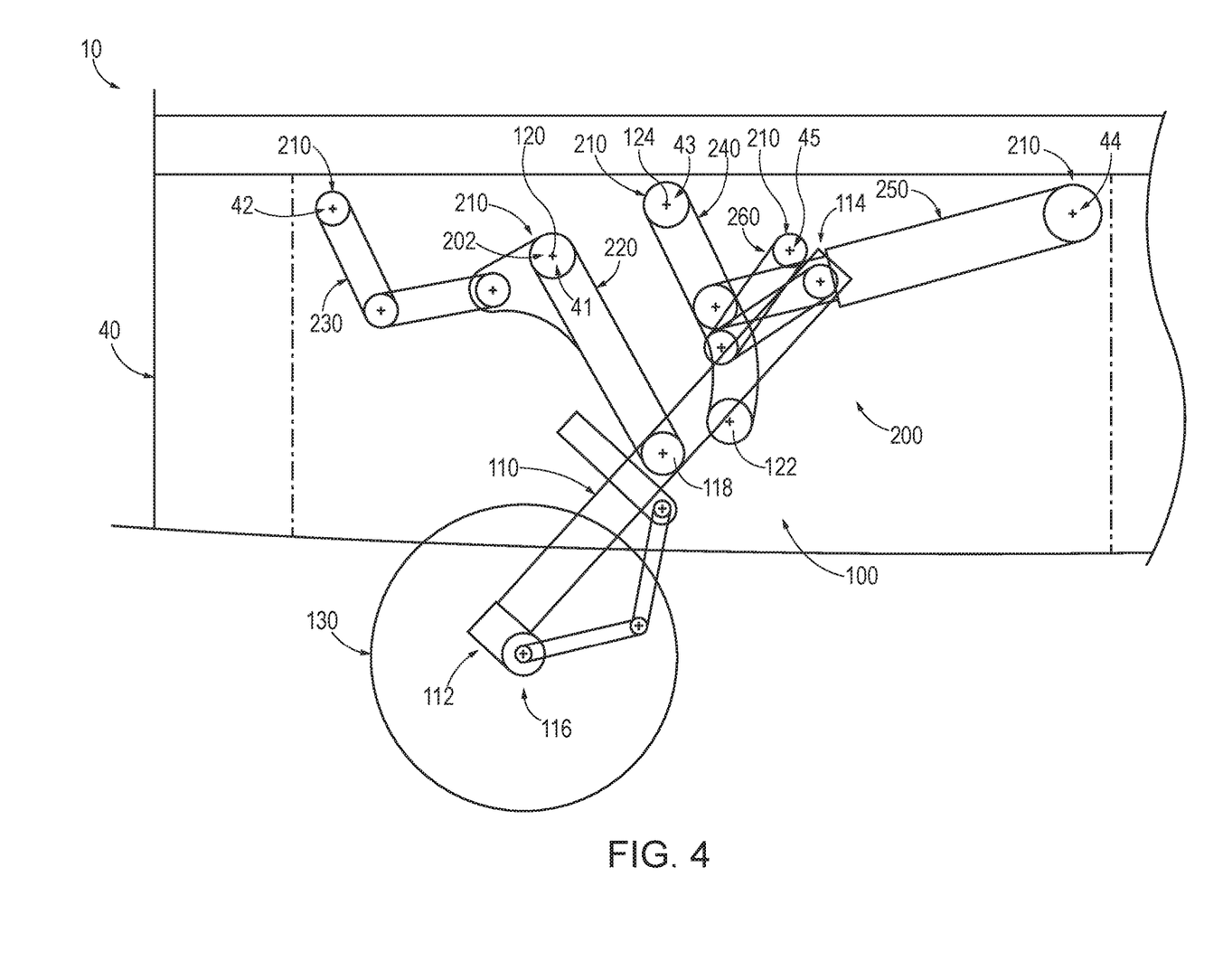
FIG. 4 is a less schematic side view illustrating an example of the landing gear assembly of FIG. 3 in an intermediate state between the stowed state and a deployed state.
Figure 5:
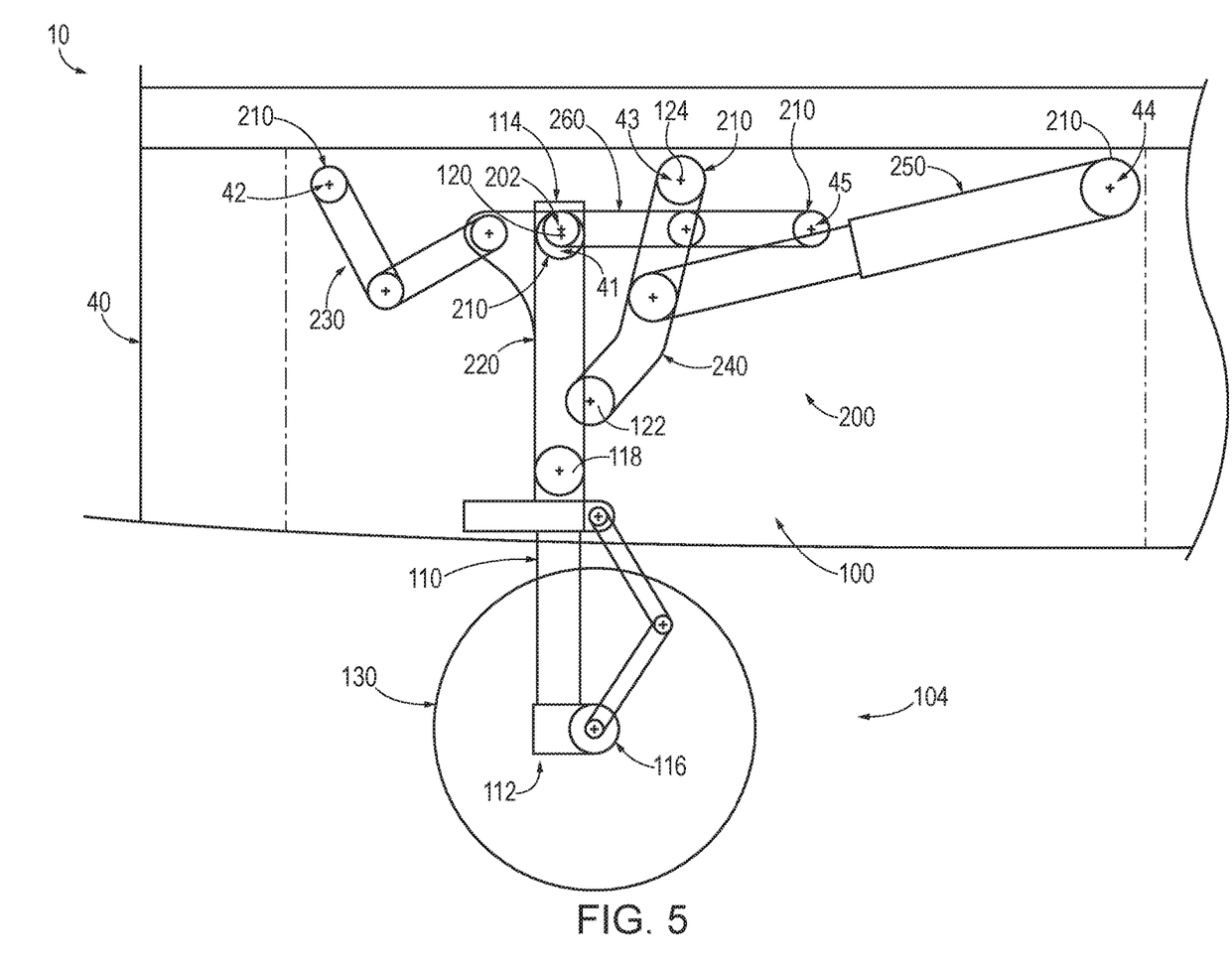
FIG. 5 is a less schematic side view illustrating an example of the landing gear assembly of FIGS. 3-4 in the deployed state.
Figure 6:
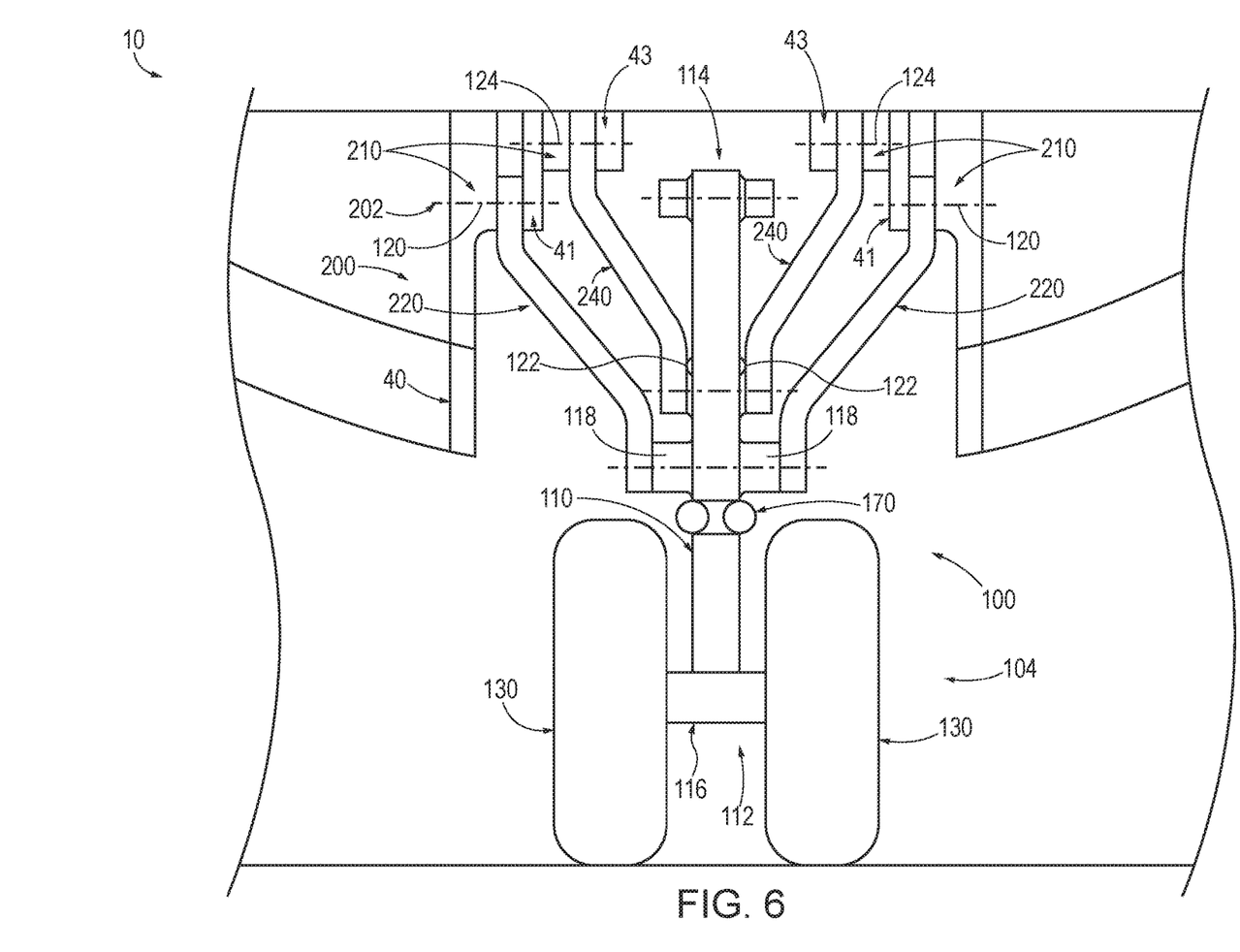
FIG. 6 is a less schematic front view illustrating the landing gear assembly of FIGS. 3-5 in the deployed state.

FIG. 2 is a schematic illustration of examples of landing gear assemblies 100 according to the present disclosure and illustrates the landing gear assemblies in both a stowed state 102, as illustrated in dotted lines, and a deployed state 104, as illustrated in dash-dot lines. FIG. 3 is a less schematic side view illustrating an example of a landing gear assembly 100, according to the present disclosure, in stowed state 102 while FIG. 4 is a less schematic side view illustrating landing gear assembly 100 of FIG. 3 in an intermediate state, which is between stowed state 102 and deployed state 104, and FIG. 5 is a less schematic side view illustrating the landing gear assembly of FIGS. 3-4 in deployed state 104. FIG. 6 is a less schematic front view illustrating landing gear assembly 100 of FIGS. 3-5 in deployed state 104, and FIGS. 7-13 are less schematic illustrations of examples of components and/or structures that may form a portion of landing gear assemblies 100, according to the present disclosure. The components and/or structures illustrated in FIGS. 7-13 are illustrated in corresponding orientations associated with deployed state 104 of FIG. 6. As illustrated in FIGS. 2-6, landing gear assemblies 100 include an elongate landing gear strut 110, a wheel assembly 130, and a deployment structure 200.

Figure 7:
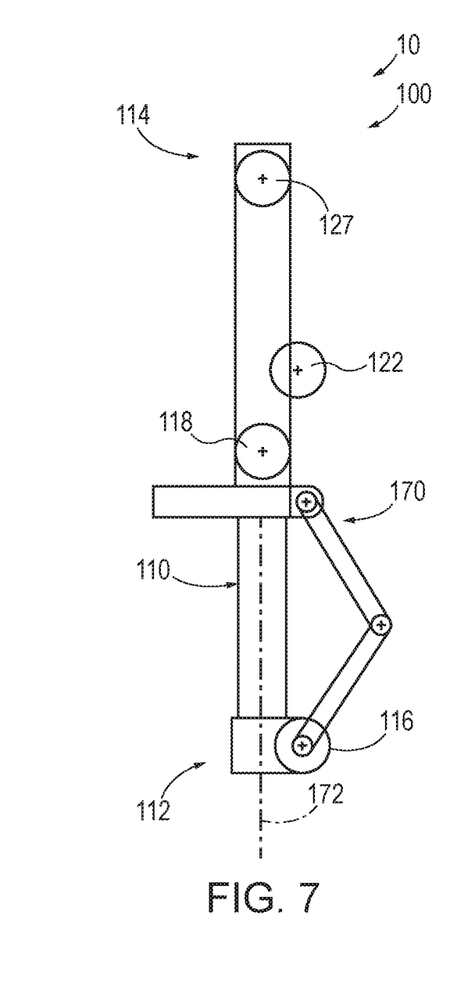
FIG. 7 is a less schematic illustration of an example of an elongate landing gear strut that may form a portion of landing gear assemblies, according to the present disclosure.

Elongate landing gear strut 110 is also illustrated in FIG. 7 and may include a first strut end region 112, a second strut end region 114, and/or a wheel assembly mount 116. Wheel assembly mount 116 may be in and/or proximal first strut end region 112. Elongate landing gear strut 110 additionally or alternatively may include a first strut mount 118, which may be positioned between first strut end region 112 and second strut end region 114, and/or a second strut mount 122, which may be positioned between first strut mount 118 and second strut end region 114. Wheel assembly 130 may be coupled, operatively coupled, and/or rotationally coupled to wheel assembly mount 116.

Deployment structure 200 may be operatively attached to elongate landing gear strut 110 and may be configured to selectively and/or operatively transition landing gear assembly 100 between stowed state 102, as illustrated in FIGS. 2-3, and deployed state 104, as illustrated in FIGS. 2 and 5-6. When in stowed state 102, landing gear assembly may be, or may be configured to be, stowed in and/or within a landing gear bay 40 of an aircraft 10. When in deployed state 104, landing gear assembly 100 may be configured to extend from landing gear bay 40, such as to support aircraft 10 relative to a ground surface. Deployment structure 200 may include at least one aircraft mount 210 and may include a plurality of aircraft mounts 210. Aircraft mount 210 may be configured to operatively attach deployment structure 200 to aircraft 10 and/or to landing gear bay 40.

In some examples, when landing gear assembly 100 is transitioned between stowed state 102 and deployed state 104, deployment structure 200 may translate, may operatively translate, may be configured to translate, or may be configured to operatively translate, elongate landing gear strut 110, an entirety of the elongate landing gear strut, and/or second strut end region 114 relative to aircraft mount 210. This translation, or operative translation, of elongate landing gear strut 110 and/or of second strut end region 114 relative to aircraft mount 210 is illustrated in FIG. 2 by the transition between stowed state 102, as illustrated in dotted lines, and deployed state 104, as illustrated in dash-dot lines. This translation, or operative translation, also is illustrated by the transition between the stowed state that is illustrated in FIG. 3 and the deployed state that is illustrated in FIG. 5. As illustrated therein, elongate landing gear strut 110 translates both vertically and horizontally upon transitioning between stowed state 102 and deployed state 104.

In these examples, the transition between stowed state 102 and deployed state 104 also may be referred to herein as a method of deploying landing gear assembly 100 that includes transitioning the landing gear assembly between the stowed state and the deployed state. In these methods, the transitioning may include operatively translating the second strut end region relative to the aircraft mount as the landing gear assembly transitions between the stowed state and the deployed state.

In other examples, when landing gear assembly 100 is transitioned between stowed state 102 and deployed state 104, deployment structure 200 may rotate, or may be configured to rotate, elongate landing gear strut 110 relative to aircraft mount 210. This rotation may be in addition to the translation, or the operative translation, of elongate landing gear strut 110 and/or second strut end region 114 that is disclosed herein and also is illustrated in FIGS. 2, 3, and 5 by the transition between stowed state 102 and deployed state 104. As illustrated therein, elongate landing gear strut 110 rotates between a horizontal, or at least substantially horizontal, orientation to a vertical, or at least substantially vertical, orientation when landing gear assembly 100 transitions between stowed state 102 and deployed state 104.

In these examples, the transition between stowed state 102 and deployed state 104 also may be referred to herein as a method of deploying landing gear assembly 100 that includes transitioning the landing gear assembly between the stowed state and the deployed state. In these methods, the transitioning may include rotating the elongate landing gear strut relative to the aircraft mount as the landing gear assembly transitions between the stowed state and the deployed state.

In still other examples, when landing gear assembly 100 is transitioned between stowed state 102 and deployed state 104, deployment structure 200 may rotate first strut mount 118 about a first axis of rotation 120 and also may rotate second strut mount 122 about a second axis of rotation 124. As illustrated, first axis of rotation 120 may differ from second axis of rotation 124. First axis of rotation 120 and/or second axis of rotation 124 may be associated with and/or may be defined by aircraft mounts 210 of deployment structure 200. As such, and when landing gear assembly 100 is installed within aircraft 10, first axis of rotation 120 and/or second axis of rotation 124 may be fixed, or may be spatially fixed, relative to the aircraft. The rotation about first axis of rotation 120 and second axis of rotation 124 also is illustrated in FIGS. 2, 3, and 5 by the transition between stowed state 102 and deployed state 104.

In these examples, the transition between stowed state 102 and deployed state 104 also may be referred to herein as a method of deploying landing gear assembly 100 that includes transitioning the landing gear assembly between the stowed state and the deployed state. In these methods, the transitioning may include rotating the first strut mount of the elongate landing gear strut about the first axis of rotation as the landing gear assembly transitions between the stowed state and the deployed state and also rotating the second strut mount of the elongate landing gear strut about the second axis of rotation as the landing gear assembly transitions between the stowed state and the deployed state.

Deployment structure 200 may include and/or be any suitable structure that may permit, facilitate, and/or generate the transition between stowed state 102 and deployed state 104 as disclosed herein. As examples, deployment structure 200 may include and/or be a nested deployment structure, a telescopic deployment structure, and/or a collapsible deployment structure. In some examples, deployment structure 200 may include and/or may define a main pivot point 202, such as first axis of rotation 120, that may be positioned vertically above wheels assembly 130 while landing gear assembly 100 is in both stowed state 102 and deployed state 104. In some examples, elongate landing gear strut 110 may have and/or define a strut length 126, as illustrated in FIG. 2, and deployment structure 200 may be configured such that wheel assembly 130 operatively translates along a forward-aft axis 128 of aircraft 10 less than a threshold fraction of strut length 126. Examples of the threshold fraction of strut length 126 include threshold fractions of less than 50%, less than 40%, less than 30%, less than 20%, and/or less than 10% of the strut length.

Figure 9:
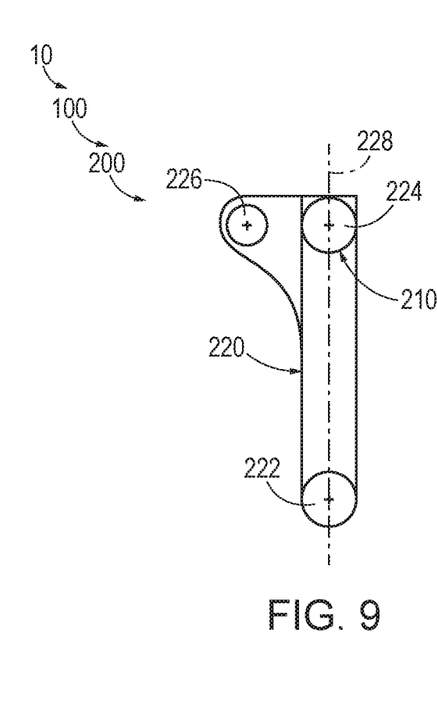
FIG. 9 is a less schematic illustration of an example of a forward link that may form a portion of landing gear assemblies, according to the present disclosure.

In some examples, and as illustrated in FIGS. 3-6 and 9, deployment structure 200 may include a forward link 220. Turning to FIG. 9, and with reference to FIGS. 3-6 for context, forward link 220, when present, may include a forward link strut mount 222 that be rotationally coupled to first strut mount 118 of elongate landing gear strut 110. Forward link 220 additionally or alternatively may include a forward link aircraft mount 224 that may be, or that may be configured to be, rotationally coupled to a forward link mount 41 of aircraft 10, as illustrated in FIGS. 3-6. Forward link aircraft mount 224 may include and/or be aircraft mount 210 that operatively attaches deployment structure 200 to aircraft 10.

Forward link 220 further may include a forward link lock mount 226. Forward link lock mount 226 may be configured to be rotationally coupled to a forward link locking structure 230 of deployment structure 200, as illustrated in FIGS. 3-5 and 13. As illustrated in FIG. 9, forward link lock mount 226 may be offset from a forward link longitudinal axis 228 of forward link 220. Forward link longitudinal axis 228 may extend between forward link strut mount 222 and forward link aircraft mount 224, as illustrated.

Deployment structure 200 also may include forward link locking structure 230. Forward link locking structure 230, when present, may be configured to selectively and/or operatively lock and/or retain landing gear assembly 100 in stowed state 102, such as by resisting motion of the landing gear assembly from the stowed state.

Figure 13:
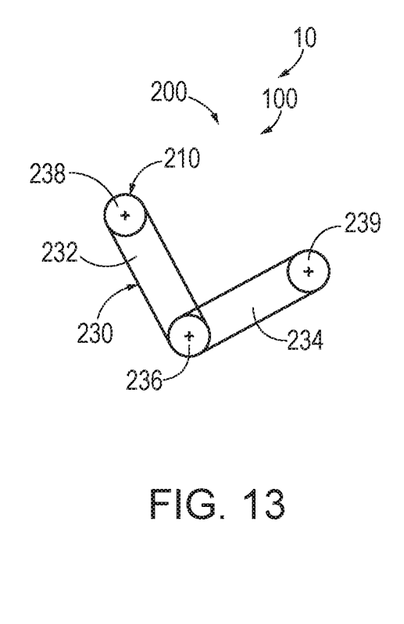
FIG. 13 is a less schematic illustration of an example of a forward link locking structure that may form a portion of landing gear assemblies, according to the present disclosure.

Forward link locking structure 230 may include and/or be any suitable structure. As an example, and as illustrated in FIGS. 2-3 and 13, forward link locking structure 230 may include and/or be a forward link scissor lock. Turning to FIG. 13, and with reference to FIGS. 3-5 for context, forward link locking structure 230 may include a first forward link locking structure linkage 232 and a second forward link locking structure linkage 234. Forward link locking structure 230 also may include a forward link locking structure pivot 236, a forward link locking structure aircraft mount 238, and a forward link locking structure link mount 239. Forward link locking structure pivot 236 may couple, or rotationally couple, first forward link locking structure linkage 232 and second forward link locking structure linkage 234 to one another. Forward link locking structure aircraft mount 238 may include and/or be an aircraft mount 210 of landing gear assembly 100 and may rotationally couple, or may be configured to rotationally couple, first forward link locking structure linkage 232 to a forward link locking structure mount 42 of aircraft 10, as illustrated in FIGS. 3-6. Forward link locking structure link mount 239 may rotationally couple, or may be configured to rotationally couple, second forward link locking structure linkage 234 to forward link 220.

Figure 10:
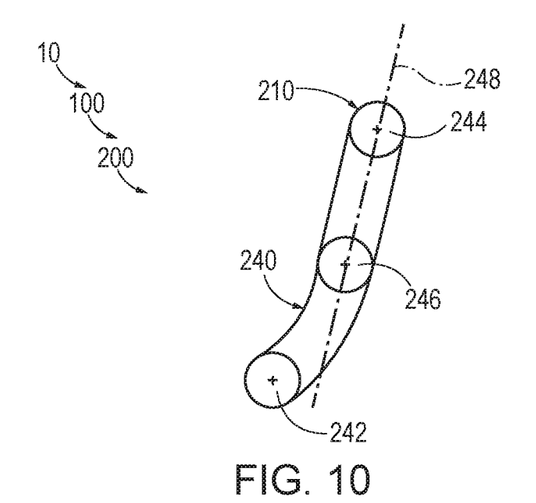
FIG. 10 is a less schematic illustration of an example of an aft link that may form a portion of landing gear assemblies, according to the present disclosure.

Deployment structure 200 also may include an aft link 240. Turning to FIG. 10, and with reference to FIGS. 3-6 for context, aft link 240 may include an aft link strut mount 242, an aft link aircraft mount 244, and an aft link actuator mount 246. Aft link strut mount 242 may rotationally couple, or may be configured to rotationally couple, aft link 240 to second strut mount 122 of elongate landing gear strut 110. Aft link aircraft mount 244 may include and/or be an aircraft mount 210 of deployment structure 200 and may be rotationally coupled to, or may be configured to be rotationally coupled to, an aft link mount 43 of aircraft 10, as illustrated in FIGS. 3-6.

Aft link actuator mount 246 may rotationally couple, or may be configured to rotationally couple, aft link 240 to an actuator 250 of deployment structure 200, as illustrated in FIGS. 3-6. As illustrated in FIG. 10, aft link strut mount 242 may be offset from an aft link elongate axis 248 of aft link 240. Aft link elongate axis may extend between aft link actuator mount 246 and aft link aircraft mount 244.

Figure 12:
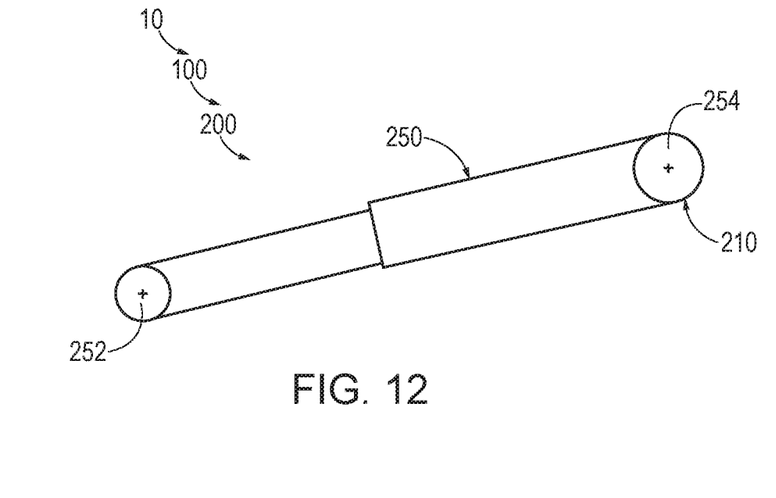
FIG. 12 is a less schematic illustration of an example of an actuator that may form a portion of landing gear assemblies, according to the present disclosure.

Deployment structure 200 further may include actuator 250. Turning to FIG. 12, and with reference to FIGS. 3-6 for context, actuator 250 may include an actuator link mount 252 and an actuator aircraft mount 254. Actuator link mount 252 may rotationally couple, or may be configured to rotationally couple, actuator 250 to aft link actuator mount 246 of aft link 240, as illustrated in FIGS. 3-6. Actuator aircraft mount 254 may include and/or be an aircraft mount 210 of deployment structure 200 and/or may rotationally couple, or may be configured to rotationally couple, actuator 250 to an actuator mount 44 of aircraft 10, as illustrated in FIGS. 3-5.

Actuator 250 may be configured to be selectively actuated and/or to provide a motive force to transition landing gear assembly 100 between stowed state 102 and deployed state 104. Actuator 250 may include any suitable structure. As an example, actuator 250 may include and/or be a linear actuator, examples of which include a hydraulic linear actuator, a hydraulic cylinder, a mechanical linear actuator, a pneumatic linear actuator, a pneumatic cylinder, and/or an electric linear actuator.

Actuator 250 may selectively transition landing gear assembly 100 between stowed state 102 and deployed state 104 in any suitable manner. As an example, actuator 250 may include and/or be an elongate actuator that extends between actuator link mount 252 and actuator aircraft mount 254. In such a configuration, actuator 250 may be configured to selectively vary a distance between actuator link mount 252 and actuator aircraft mount 254 to transition the landing gear between stowed state 102 and deployed state 104.

Figure 11:
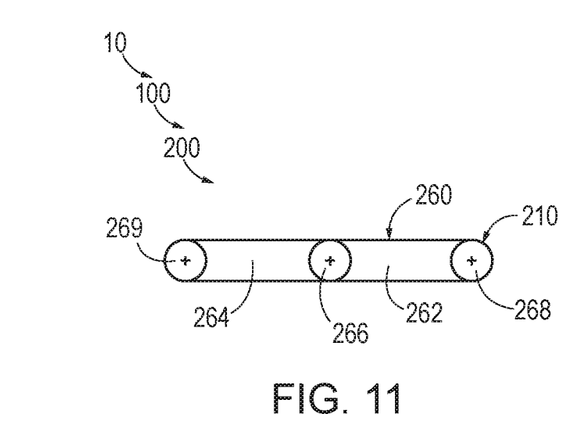
FIG. 11 is a less schematic illustration of an example of a strut locking structure that may form a portion of landing gear assemblies, according to the present disclosure.

Deployment structure 200 also may include a strut locking structure 260. Turning to FIG. 11, and with reference to FIGS. 3-5 for context, strut locking structure 260 may be configured to selectively and/or operatively retain landing gear assembly 100 in deployed state 104, such as by resisting motion of the landing gear assembly from the deployed state.

Strut locking structure 260 may include and/or be any suitable structure. As an example, and as illustrated in FIGS. 3-5 and 11, strut locking structure 260 may include and/or be a strut scissor lock. Turning to FIG. 11, and with reference to FIGS. 3-5 for context, strut locking structure 260 may include a first strut locking structure linkage 262 and a second strut locking structure linkage 264. Strut locking structure 260 also may include a strut locking structure pivot 266, a strut locking structure aircraft mount 268, and a strut locking structure link mount 269. Strut locking structure pivot 266 may couple, or rotationally couple, first strut locking structure linkage 262 and second strut locking structure linkage 264 to one another. Strut locking structure aircraft mount 268 may include and/or be an aircraft mount 210 of landing gear assembly 100 and may rotationally couple, or may be configured to rotationally couple, first strut locking structure linkage 262 to a strut locking structure mount 45 of aircraft 10, as illustrated in FIGS. 3-5. Strut locking structure link mount 269 may rotationally couple, or may be configured to rotationally couple, second strut locking structure linkage 264 to a strut locking structure mount 127 of elongate landing gear strut 110, as illustrated in FIG. 7.

Aircraft mounts 210 may include any suitable structure that may, that may be utilized to, and/or that may be configured to operatively attach landing gear assembly 100 and/or deployment structure 200 thereof to aircraft 10. Examples of aircraft mounts 210 include rotational mounts and/or pivot mounts. Once aircraft mounts 210 have been operatively attached to aircraft 10, such as to forward link mount 41, forward link locking structure mount 42, aft link mount 43, actuator mount 44, and/or strut locking structure mount 45 thereof, a relative orientation among at least a subset, or even all, aircraft mounts 210 may be fixed, or at least substantially fixed, as landing gear assembly 100 transitions between stowed state 102 and deployed state 104. Stated another way, mounts 41/42/43/44/45 may be rigid mounts, a relative orientation among mounts 41/42/43/44/45 may be fixed, a relative orientation of mounts 41/42/43/44/45 relative to landing gear bay 40 may be fixed, and/or a relative orientation of mounts 41/42/43/44/45 relative to aircraft 10 may be fixed.

Elongate landing gear strut 110 may include any suitable structure that may include and/or define first strut end region 112, second strut end region 114, wheel assembly mount 116, first strut mount 118, second strut mount 122, and/or strut locking structure mount 127. As an example, elongate landing gear strut 110 may include and/or be an oleo strut. Elongate landing gear strut 110 may be configured to absorb landing forces along a longitudinal length thereof. As an example, elongate landing gear strut 110 may include a shock absorber configured to absorb the landing forces.

Wheel assembly 130 may include any suitable structure that may be coupled to wheel assembly mount 116 of elongate landing gear strut 110, that may be configured to contact the ground surface when the aircraft is on the ground, and/or that may be configured to support aircraft 10 relative to the ground surface. As examples, and with reference to FIG. 8, wheel assembly 130 may include a tire 132, a wheel 134, and/or a hub 136. Tire 132 may be mounted on and/or operatively attached to wheel 134. Wheel 134 may be operatively attached and/or mounted to hub 136. Hub 136 may be configured to permit rotation of wheel 134 relative to elongate landing gear strut 110 and/or about a wheel rotational axis 138.

Figure 8:
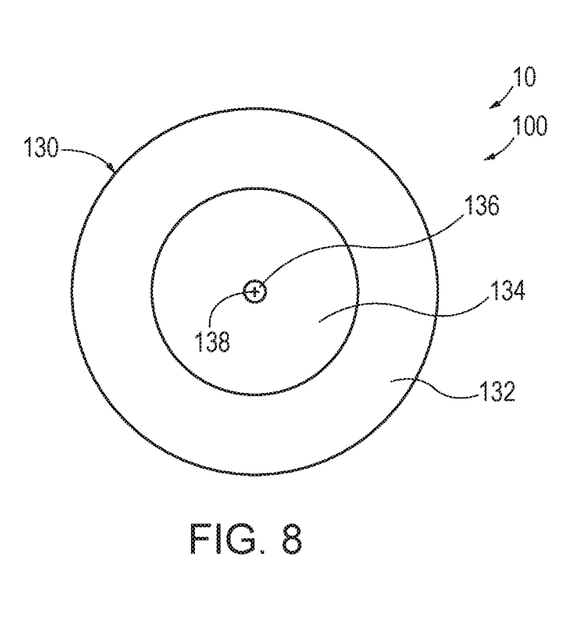
FIG. 8 is a less schematic illustration of an example of a wheel assembly that may form a portion of landing gear assemblies, according to the present disclosure.

As illustrated in FIG. 7, landing gear assembly 100 and/or elongate landing gear strut 110 thereof may include and/or may be operatively attached to a steering assembly 170. Steering assembly 170 may be configured to operatively rotate wheel assembly 130 relative to elongate landing gear strut 110 and/or about a steering axis 172. Steering axis 172 may be parallel, or at least substantially parallel, to an elongate axis of elongate landing gear strut 110 and/or may be perpendicular, or at least substantially perpendicular, to wheel rotational axis 138 of wheel assembly 130, which is illustrated in FIG. 8.

For simplicity, FIGS. 2-5 and 7-13 illustrate the various components and/or structures of landing gear assembly 100 in the singular. However, and as illustrated in FIG. 6, it is within the scope of the present disclosure that landing gear assembly 100 may include one or more of several of the components and/or structures disclosed herein. As an example, landing gear assembly 100 may include two of several of the disclosed components and/or structures, with the two components and/or structures being arranged on opposed sides of elongate landing gear strut 110, such as in a mirror image fashion. As a more specific example, and as illustrated in FIG. 6, landing gear assembly 100 may include two wheel assemblies 130, two forward links 220, and/or two aft links 240. Landing gear assembly 100 additionally or alternatively may include two forward link locking structures 230, two actuators 250, and/or two strut locking structures 260.

Several of the components and/or structures, which are disclosed herein, are described as being "rotationally coupled" to one another. As used herein, the phrase "rotationally coupled," when utilized to describe coupling between two objects, components, and/or member, may indicate the two objects, components, and/or members may be configured to rotate relative to one another, such as about a corresponding axis of rotation and/or about a single corresponding axis of rotation. Such objects, components, and/or members additionally or alternatively may be referred to herein as being "rotatingly coupled" to one another. Examples of structures that may be included in and/or utilized with the disclosed objects, components, and/or members to produce and/or generate the disclosed rotational coupling include revolute joints, pin joints, and/or hinge joints that may provide a, or a single, degree of freedom, or rotational freedom, between the rotationally coupled objects, components, and/or members.

Illustrative, non-exclusive examples of inventive subject matter according to the present disclosure are described in the following enumerated paragraphs:

A1. A landing gear assembly for an aircraft, the landing gear assembly comprising:

an elongate landing gear strut that includes a first strut end region, an opposed second strut end region, and a wheel assembly mount in the first strut end region;

a wheel assembly coupled to the wheel assembly mount; and a deployment structure, wherein the deployment structure:

(i) includes an aircraft mount optionally that is configured to operatively attach the deployment structure to a landing gear bay of the aircraft;

(ii) is configured to selectively transition the landing gear assembly between a stowed state, optionally in which the landing gear assembly is configured to be stowed within the landing gear bay of the aircraft, and a deployed state, optionally in which the landing gear assembly is configured to extend from the landing gear bay of the aircraft; and (iii) is configured to translate at least one of the elongate landing gear strut and the second strut end region relative to the aircraft mount as the landing gear assembly transitions between the stowed state and the deployed state and optionally to rotate the elongate landing gear strut relative to the aircraft mount as the landing gear assembly transitions between the stowed state and the deployed state.

B1. A landing gear assembly for an aircraft, the landing gear assembly comprising:
an elongate landing gear strut that includes:
(i) a first strut end region;
(ii) an opposed second strut end region;
(iii) a wheel assembly mount in the first strut end region;
(iv) a first strut mount positioned between the first strut end region and the second strut end region; and
(v) a second strut mount positioned between the first strut mount and the second strut end region;
a wheel assembly coupled to the wheel assembly mount; and
a deployment structure operatively attached to the elongate landing gear strut, wherein the deployment structure is configured to:
(i) selectively transition the landing gear assembly between a stowed state, optionally in which the landing gear assembly is configured to be stowed within a landing gear bay of the aircraft, and a deployed state, optionally in which the landing gear assembly is configured to extend from the landing gear bay of the aircraft;
(ii) rotate the first strut mount about a first axis of rotation as the landing gear assembly transitions between the stowed state and the deployed state; and
(iii) rotate the second strut mount about a second axis of rotation as the landing gear assembly transitions between the stowed state and the deployed state.

C1. The landing gear assembly of any of paragraphs A1-B1, wherein the elongate landing gear strut includes:
(i) a/the first strut mount positioned between the first strut end region and the second strut end region; and
(ii) a/the second strut mount positioned between the first strut mount and the second strut end region.

C2. The landing gear assembly of paragraph C1, wherein the deployment structure further includes a forward link that includes a forward link strut mount, which is rotationally coupled to the first strut mount of the elongate landing gear strut, and a forward link aircraft mount, which is configured to be rotationally coupled to a forward link mount of the aircraft.

C3. The landing gear assembly of paragraph C2, wherein the forward link aircraft mount is a/the aircraft mount that operatively attaches the deployment structure to the aircraft.

C4. The landing gear assembly of any of paragraphs C2-C3, wherein the forward link further includes a forward link lock mount, configured to be rotationally coupled to a forward link locking structure of the deployment structure.

C5. The landing gear assembly of paragraph C4, wherein the forward link lock mount is offset from a forward link elongate axis that extends between the forward link strut mount and the forward link aircraft mount.

C6. The landing gear assembly of any of paragraphs C4-C5, wherein the deployment structure further includes the forward link locking structure.

C7. The landing gear assembly of any of paragraphs C4-C6, wherein the forward link locking structure is configured to selectively and operatively retain the landing gear assembly in the stowed state by resisting motion of the landing gear assembly from the stowed state.

C8. The landing gear assembly of any of paragraphs C5-C7, wherein the forward link locking structure includes a forward link scissor lock.

C9. The landing gear assembly of any of paragraphs C5-C8, wherein the forward link locking structure includes:
(i) a first forward link locking structure linkage;
(ii) a second forward link locking structure linkage;
(iii) a forward link locking structure pivot that rotationally couples the first forward link locking structure linkage to the second forward link locking structure linkage;
(iv) a forward link locking structure aircraft mount configured to rotationally couple the first forward link locking structure linkage to a forward link locking structure mount of the aircraft; and
(v) a forward link locking structure link mount configured to rotationally couple the second forward link locking structure linkage to the forward link.

C10. The landing gear assembly of any of paragraphs C2-C9, wherein the deployment structure further includes an aft link that includes an aft link strut mount rotationally coupled to the second strut mount of the elongate landing gear strut and an aft link aircraft mount configured to be rotationally coupled to an aft link mount of the aircraft.

C11. The landing gear assembly of paragraph C10, wherein the aft link aircraft mount is a/the aircraft mount that operatively attaches the deployment structure to the aircraft.

C12. The landing gear assembly of any of paragraphs C10-C11, wherein the aft link further includes an aft link actuator mount rotationally coupled to an actuator of the deployment structure.

C13. The landing gear assembly of paragraph C12, wherein the aft link strut mount is offset from an aft link elongate axis that extends between the aft link actuator mount and the aft link aircraft mount.

C14. The landing gear assembly of any of paragraphs C12-C13, wherein the deployment structure further includes the actuator.

C15. The landing gear assembly of paragraph C14, wherein the actuator includes a linear actuator.

C16. The landing gear assembly of any of paragraphs C14-C15, wherein the actuator includes an actuator link mount that rotationally couples the actuator to the aft link actuator mount.

C17. The landing gear assembly of any of paragraphs C14-C16, wherein the actuator includes an actuator aircraft mount configured to rotationally couple the actuator to an actuator mount of the aircraft.

C18. The landing gear assembly of any of paragraphs C14-C17, wherein the actuator is an elongate actuator that extends between a/the actuator link mount and a/the actuator aircraft mount.

C19. The landing gear assembly of paragraph C18, wherein the actuator is configured to selectively vary a distance between the actuator link mount and the actuator aircraft mount to transition the landing gear assembly between the stowed state and the deployed state.

C20. The landing gear assembly of any of paragraphs A1-C19, wherein the deployment structure further includes a strut locking structure.

C21. The landing gear assembly of paragraph C20, wherein the strut locking structure is configured to selectively and operatively retain the landing gear assembly in the deployed state.

C22. The landing gear assembly of any of paragraphs C20-C21, wherein the strut locking structure includes a strut scissor lock.

C23. the landing gear assembly of any of paragraphs C20-C22, wherein the strut locking structure includes:
(i) a first strut locking structure linkage;
(ii) a second strut locking structure linkage;
(iii) a strut locking structure pivot that rotationally couples the first strut locking structure linkage to the second strut locking structure linkage;

(iv) a strut locking structure aircraft mount configured to rotationally couple the first strut locking structure linkage to a strut locking structure mount of the aircraft; and (v) a strut locking structure link mount configured to rotationally couple the second strut locking structure linkage to the elongate landing gear strut.

C24. The landing gear assembly of any of paragraphs A1-C23, wherein, when the landing gear transitions between the stowed state and the deployed state, the deployment structure is configured maintain a fixed relative orientation between at least two, optionally at least three, optionally at least four, or optionally all five of:

(i) a/the forward link aircraft mount;
(ii) a/the forward link locking structure aircraft mount;
(iii) an/the aft link aircraft mount;
(iv) an/the actuator aircraft mount; and
(v) a/the strut locking structure aircraft mount.

C25. The landing gear assembly of any of paragraphs A1-C24, wherein the elongate landing gear strut is configured to absorb landing forces applied along a longitudinal axis thereof.

C26. The landing gear assembly of any of paragraphs A1-C25, wherein the elongate landing gear strut includes a shock absorber configured to absorb landing forces along a/the longitudinal axis thereof.

C27. The landing gear assembly of any of paragraphs A1-C26, wherein the wheel assembly includes a tire, a wheel, and a hub, wherein the tire is mounted on the wheel, wherein the wheel is operatively attached to the hub, and further wherein the hub is configured to permit rotation of the wheel relative to the elongate landing gear strut about a wheel rotational axis.

C28. The landing gear assembly of any of paragraphs A1-C27, wherein the deployment structure includes at least one of:

(i) a nested deployment structure;
(ii) a telescopic deployment structure; and
(iii) a collapsible deployment structure.

C29. The landing gear assembly of any of paragraphs A1-C28, wherein the deployment structure includes a main pivot point that is positioned vertically above the wheel assembly while the landing gear assembly is in both the stowed state and the deployed state.

C30. The landing gear assembly of any of paragraphs A1-C29, wherein the elongate landing gear strut has a strut length, and further wherein the deployment structure is configured such that the wheel assembly operatively translates, along a forward-aft axis, less than a threshold fraction of the strut length.

C31. The landing gear assembly of paragraph C30, wherein the threshold fraction of the strut length is less than 50%, less than 40%, less than 30%, less than 20%, or less than 10% of the strut length.

C32. The landing gear assembly of any of paragraphs A1-C31, wherein the aircraft landing gear assembly further includes a steering assembly configured to operatively rotate the wheel assembly relative to the elongate landing gear strut about a steering axis that is at least substantially perpendicular to a/the wheel rotational axis of the wheel assembly.

D1. An aircraft, comprising:
a fuselage;
a wing;
a landing gear bay; and
the landing gear assembly of any of paragraphs A1-C32.

D2. The aircraft of paragraph D1, wherein the landing gear assembly is a nose landing gear assembly of the aircraft.

E1. A method of deploying a landing gear assembly for an aircraft, the method comprising:

transitioning the landing gear assembly between a stowed state and a deployed state, wherein the landing gear assembly includes:

(i) an elongate landing gear strut that includes a first strut end region, an opposed second strut end region, and a wheel assembly mount in the first strut end region;

(ii) a wheel assembly coupled to the wheel assembly mount; and (iii) a deployment structure that includes an aircraft mount;

and further wherein at least one of:

(i) the transitioning includes operatively translating the second strut end region relative to the aircraft mount as the landing gear assembly transitions between the stowed state and the deployed state;

(ii) translating the elongate landing gear strut relative to the aircraft mount and rotating the elongate landing gear strut relative to the aircraft mount as the landing gear assembly transitions between the stowed state and the deployed state; and (iii) rotating a first strut mount of the elongate landing gear strut about a first axis of rotation as the landing gear assembly transitions between the stowed state and the deployed state and also rotating a second strut mount of the elongate landing gear strut about a second axis of rotation as the landing gear assembly transitions between the stowed state and the deployed state.

E2. The method of paragraph E1, wherein the landing gear assembly includes any suitable structure of any of the landing gear assemblies of any of paragraphs A1-C32 or any of the aircraft of any of paragraphs D1-D2.

F1. The use of the landing gear assembly of any of paragraphs A1-C32 to support an aircraft.

F2. The use of any of the landing gear assemblies of any of paragraphs A1-C32 or any of the aircraft of any of paragraphs D1-D2 with any of the methods of any of paragraphs E1-E2.

F3. The use of any of the methods of any of paragraphs F1-F2 with any of the landing gear assemblies of any of paragraphs A1-C32 or any of the aircraft of any of paragraphs D1-D2.

F4. The use of a deployment structure to transition a landing gear assembly between a stowed state and a deployed state.

As used herein, the terms "selective" and "selectively," when modifying an action, movement, configuration, or other activity of one or more components or characteristics of an apparatus, mean that the specific action, movement, configuration, or other activity is a direct or indirect result of user manipulation of an aspect of, or one or more components of, the apparatus.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

As used herein, the phrase "at least one," in reference to a list of one or more entities should be understood to mean at least one entity selected from any one or more of the entities in the list of entities, but not necessarily including at least one of each and every entity specifically listed within the list of entities and not excluding any combinations of entities in the list of entities. This definition also allows that entities may optionally be present other than the entities specifically identified within the list of entities to which the phrase "at least one" refers, whether related or unrelated to those entities specifically identified. Thus, as a non-limiting example, "at least one of A and B" (or, equivalently, "at least one of A or B," or, equivalently "at least one of A and/or B") may refer, in one embodiment, to at least one, optionally including more than one, A, with no B present (and optionally including entities other than B); in another embodiment, to at least one, optionally including more than one, B, with no A present (and optionally including entities other than A); in yet another embodiment, to at least one, optionally including more than one, A, and at least one, optionally including more than one, B (and optionally including other entities). In other words, the phrases "at least one," "one or more," and "and/or" are open-ended expressions that are both conjunctive and disjunctive in operation. For example, each of the expressions "at least one of A, B, and C," "at least one of A, B, or C," "one or more of A, B, and C," "one or more of A, B, or C," and "A, B, and/or C" may mean A alone, B alone, C alone, A and B together, A and C together, B and C together, A, B, and C together, and optionally any of the above in combination with at least one other entity.

The various disclosed elements of apparatuses and steps of methods disclosed herein are not required to all apparatuses and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus or method. Accordingly, such inventive subject matter is not required to be associated with the specific apparatuses and methods that are expressly disclosed herein, and such inventive subject matter may find utility in apparatuses and/or methods that are not expressly disclosed herein.

As used herein, the phrase, "for example," the phrase, "as an example," and/or simply the term "example," when used with reference to one or more components, features, details, structures, embodiments, and/or methods according to the present disclosure, are intended to convey that the described component, feature, detail, structure, embodiment, and/or method is an illustrative, non-exclusive example of components, features, details, structures, embodiments, and/or methods according to the present disclosure. Thus, the described component, feature, detail, structure, embodiment, and/or method is not intended to be limiting, required, or exclusive/exhaustive; and other components, features, details, structures, embodiments, and/or methods, including structurally and/or functionally similar and/or equivalent components, features, details, structures, embodiments, and/or methods, are also within the scope of the present disclosure.

The invention claimed is:

1. A landing gear assembly for an aircraft, the landing gear assembly comprising:
    an elongate landing gear strut that includes a first strut end region, an opposed second strut end region, a wheel assembly mount in the first strut end region, a first strut mount positioned between the first strut end region and the second strut end region, and a second strut mount positioned between the first strut mount and the second strut end region;
    a wheel assembly coupled to the wheel assembly mount; and
    a deployment structure, wherein the deployment structure:
    (i) includes an aircraft mount;
    (ii) is configured to selectively transition the landing gear assembly between a stowed state and a deployed state; and
    (iii) is configured to operatively translate the second strut end region relative to the aircraft mount as the landing gear assembly transitions between the stowed state and the deployed state.

2. The aircraft landing gear assembly of claim 1, wherein the deployment structure further includes a forward link that includes a forward link strut mount, which is rotationally coupled to the first strut mount of the elongate landing gear strut, and a forward link aircraft mount, which is configured to be rotationally coupled to a forward link mount of the aircraft.

3. The aircraft landing gear assembly of claim 2, wherein the forward link further includes a forward link lock mount, which is configured to be rotationally coupled to a forward link locking structure of the deployment structure.

4. The aircraft landing gear assembly of claim 3, wherein the forward link lock mount is offset from a forward link elongate axis that extends between the forward link strut mount and the forward link aircraft mount.

5. The aircraft landing gear assembly of claim 3, wherein the deployment structure further includes the forward link locking structure, which is configured to selectively and operatively retain the landing gear assembly in the stowed state by resisting motion of the landing gear assembly from the stowed state.

6. The aircraft landing gear assembly of claim 2, wherein, when the landing gear assembly transitions between the stowed state and the deployed state, the deployment structure is configured maintain a fixed relative orientation between the aircraft mount and the forward link aircraft mount.

7. The aircraft landing gear assembly of claim 1, wherein the deployment structure further includes an aft link that includes an aft link strut mount rotationally coupled to the second strut mount of the elongate landing gear strut and an aft link aircraft mount configured to be rotationally coupled to an aft link mount of the aircraft.

8. The aircraft landing gear assembly of claim 7, wherein the aft link further includes an aft link actuator mount rotationally coupled to an actuator of the deployment structure.

9. The aircraft landing gear assembly of claim 8, wherein the aft link strut mount is offset from an aft link elongate axis that extends between the aft link actuator mount and the aft link aircraft mount.

10. The aircraft landing gear assembly of claim 8, wherein the deployment structure further includes the actuator.

11. The aircraft landing gear assembly of claim 10, wherein the actuator includes a linear actuator.

12. The aircraft landing gear assembly of claim 10, wherein the actuator includes an actuator link mount that rotationally couples the actuator to the aft link actuator mount and an actuator aircraft mount configured to rotationally couple the actuator to an actuator mount of the aircraft.

13. The aircraft landing gear assembly of claim 10, wherein the actuator is an elongate actuator that extends between an actuator link mount and an actuator aircraft mount.

14. The aircraft landing gear assembly of claim 13, wherein the actuator is configured to selectively vary a distance between the actuator link mount and the actuator aircraft mount to transition the landing gear assembly between the stowed state and the deployed state.

15. The aircraft landing gear assembly of claim 1, wherein the deployment structure further includes a strut locking structure configured to selectively and operatively retain the landing gear assembly in the deployed state.

16. An aircraft, comprising:
 a fuselage;
 a wing;
 a landing gear bay; and
 the landing gear assembly of claim 1 operatively attached to the landing gear bay.

17. The aircraft of claim 16, wherein the landing gear assembly is a nose landing gear assembly of the aircraft.

18. A landing gear assembly for an aircraft, the landing gear assembly comprising:
 an elongate landing gear strut that includes:
  (i) a first strut end region;
  (ii) an opposed second strut end region;
  (iii) a wheel assembly mount in the first strut end region;
  (iv) a first strut mount positioned between the first strut end region and the second strut end region; and
  (v) a second strut mount positioned between the first strut mount and the second strut end region;
 a wheel assembly coupled to the wheel assembly mount; and
 a deployment structure operatively attached to the elongate landing gear strut, wherein the deployment structure is configured to:
  (i) selectively transition the landing gear assembly between a stowed state and a deployed state;
  (ii) rotate the first strut mount about a first axis of rotation as the landing gear assembly transitions between the stowed state and the deployed state; and
  (iii) rotate the second strut mount about a second axis of rotation as the landing gear assembly transitions between the stowed state and the deployed state.

19. A method of deploying a landing gear assembly for an aircraft, the method comprising:
 transitioning the landing gear assembly between a stowed state and a deployed state, wherein the landing gear assembly includes:
  (i) an elongate landing gear strut that includes a first strut end region, an opposed second strut end region, a wheel assembly mount in the first strut end region, a first strut mount positioned between the first strut end region and the second strut end region, and a second strut mount positioned between the first strut mount and the second strut end region;
  (ii) a wheel assembly coupled to the wheel assembly mount; and
  (iii) a deployment structure that includes an aircraft mount;
 and further wherein at least one of:
  (i) the transitioning includes operatively translating the second strut end region relative to the aircraft mount as the landing gear assembly transitions between the stowed state and the deployed state;
  (ii) translating the elongate landing gear strut relative to the aircraft mount and rotating the elongate landing gear strut relative to the aircraft mount as the landing gear assembly transitions between the stowed state and the deployed state; and
  (iii) rotating a first strut mount of the elongate landing gear strut about a first axis of rotation as the landing gear assembly transitions between the stowed state and the deployed state and also rotating a second strut mount of the elongate landing gear strut about a second axis of rotation as the landing gear assembly transitions between the stowed state and the deployed state.

20. The method of claim 19, wherein the deployment structure is operatively attached to the elongate landing gear strut.

* * * * *